(12) United States Patent
Arora et al.

(10) Patent No.: US 12,184,535 B1
(45) Date of Patent: Dec. 31, 2024

(54) INCREASING ROBUSTNESS OF CONNECTIONS BY OFFLOADING KEEP ALIVE PROTOCOL DATA UNITS

(71) Applicant: Juniper Networks, Inc., Sunnyvale, CA (US)

(72) Inventors: Amit Arora, Bangalore (IN); Erin C. MacNeil, Carp (CA); Harmeet Singh, Bangalore (IN); Sairam Neelam, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/112,886

(22) Filed: Feb. 22, 2023

(51) Int. Cl.
| | | |
|---|---|---|
| *G06F 15/173* | (2006.01) | |
| *G06F 15/16* | (2006.01) | |
| *H04L 45/02* | (2022.01) | |
| *H04L 45/44* | (2022.01) | |
| *H04L 67/145* | (2022.01) | |

(52) U.S. Cl.
CPC .............. *H04L 45/04* (2013.01); *H04L 45/44* (2013.01); *H04L 67/145* (2013.01)

(58) Field of Classification Search
CPC ........ H04L 45/04; H04L 45/44; H04L 67/145
USPC ........................................ 709/230, 238–239
See application file for complete search history.

(56) References Cited

U.S. PATENT DOCUMENTS

| | | | | |
|---|---|---|---|---|
| 7,499,394 | B2 * | 3/2009 | Visser | H04L 45/00 370/392 |
| 7,702,810 | B1 * | 4/2010 | Pan | H04L 45/645 370/216 |
| 9,792,106 | B1 * | 10/2017 | Kommula | H04L 41/082 |
| 11,496,559 | B1 * | 11/2022 | Grewal | H04L 45/04 |
| 11,750,441 | B1 * | 9/2023 | Thomas | H04L 67/145 370/242 |
| 2013/0033978 | A1 * | 2/2013 | Eckert | H04L 45/22 370/216 |
| 2016/0191371 | A1 * | 6/2016 | Dujodwala | H04L 45/02 370/254 |
| 2016/0380984 | A1 * | 12/2016 | Johnson | H04L 63/0485 713/153 |
| 2020/0220843 | A1 * | 7/2020 | Hill | H04L 45/026 |
| 2021/0306256 | A1 * | 9/2021 | Ward | H04L 45/04 |

* cited by examiner

*Primary Examiner* — Bharat Barot
(74) *Attorney, Agent, or Firm* — Harrity & Harrity, LLP

(57) ABSTRACT

A network device may establish, via a routing protocol daemon (RPD) of the network device, border gateway protocol (BGP) sockets with peer network devices and may establish a socket between the RPD and a periodic packet management daemon (PPMD) of the network device. The network device may provide file descriptors of the BGP sockets from the RPD to the PPMD, via the socket, and may provide, from the RPD and via the BGP sockets, non-keep alive protocol data units (PDUs) to the peer network devices. The network device may provide, from the PPMD and via the BGP sockets, keep alive PDUs to the peer network devices.

20 Claims, 10 Drawing Sheets

INCREASING ROBUSTNESS OF CONNECTIONS BY OFFLOADING KEEP ALIVE PROTOCOL DATA UNITS

BACKGROUND

A border gateway protocol (BGP) is a routing protocol that executes on top of a transmission control protocol (TCP). The BGP utilizes keep alive protocol data units (e.g., packets), which are exchanged periodically between peer network devices.

SUMMARY

Some implementations described herein relate to a method. The method may include establishing, via a routing protocol daemon (RPD) of a network device, border gateway protocol (BGP) sockets with peer network devices, and establishing a socket between the RPD and a periodic packet management daemon (PPMD) of the network device. The method may include providing file descriptors of the BGP sockets from the RPD to the PPMD, via the socket and providing, from the RPD and via the BGP sockets, non-keep alive protocol data units (PDUs) to the peer network devices. The method may include providing, from the PPMD and via the BGP sockets, keep alive PDUs to the peer network devices.

Some implementations described herein relate to a network device. The network device may include one or more memories and one or more processors. The one or more processors may be configured to establish, via an RPD of the network device, protocol sockets with peer network devices, and establish a socket between the RPD and a PPMD of the network device. The one or more processors may be configured to provide file descriptors of the protocol sockets from the RPD to the PPMD, via the socket, and provide, from the RPD and via the protocol sockets, non-keep alive PDUs to the peer network devices. The one or more processors may be configured to provide, from the PPMD and via the protocol sockets, keep alive PDUs to the peer network devices.

Some implementations described herein relate to a non-transitory computer-readable medium that stores a set of instructions. The set of instructions, when executed by one or more processors of a network device, may cause the network device to establish, via an RPD of a network device, BGP sockets with peer network devices, and establish a socket between the RPD and a PPMD of the network device. The set of instructions, when executed by one or more processors of the network device, may cause the network device to provide file descriptors of the BGP sockets from the RPD to the PPMD, via the socket, and provide, from the RPD and via the BGP sockets, non-keep alive PDUs to the peer network devices. The set of instructions, when executed by one or more processors of the network device, may cause the network device to provide, from the PPMD and via the BGP sockets, keep alive PDUs to the peer network devices.

DETAILED DESCRIPTION

Figure 1A:
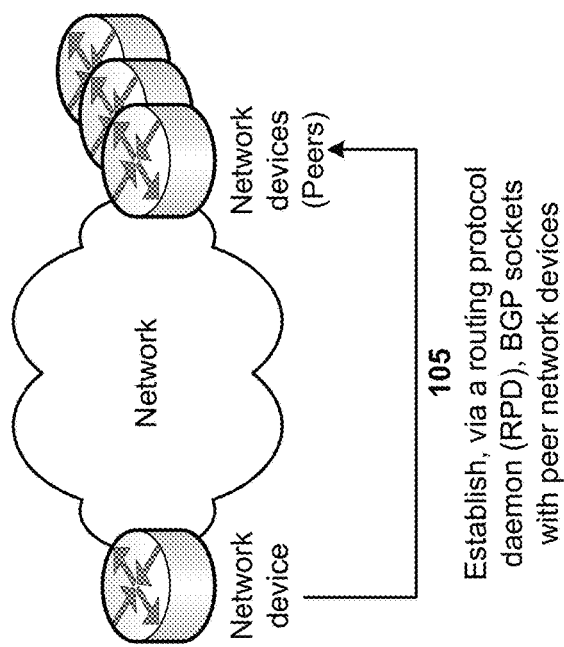
FIGS. 1A-1F are diagrams of an example associated with increasing robustness of connections by offloading keep alive protocol data units (PDUs).

The following detailed description of example implementations refers to the accompanying drawings. The same reference numbers in different drawings may identify the same or similar elements.

For a border gateway protocol (BGP) session to be in an established state, each network device of a BGP connection should receive at least one keep alive protocol data unit (PDU) or one non-keep alive PDU before a hold timer expires (e.g., after a quantity of seconds, minutes, and/or the like). In a network device, BGP input/output threads executing in a routing protocol daemon (RPD) may handle BGP input/output traffic. In a highly scaled network environment, with thousands of BGP sessions and with different BGP sessions having different hold timers and high rate input/output, any of the BGP sessions can flap (e.g., become unstable) if the RPD is unable to send periodic keepalive PDUs for all the BGP sessions before respective hold timers expire. BGP session flaps because of hold timer expiration may be more frequent when the hold timers are aggressively configured. If the RPD is busy performing other protocol related activities (e.g., reacting to route churns in a network, handling local faults in the network device, and/or the like), the RPD may be unable to send BGP keep alive PDUs in a timely fashion, which leads to BGP session flaps.

Thus, current techniques for maintaining BGP sessions consume computing resources (e.g., processing resources, memory resources, communication resources, and/or the like), networking resources, and/or the like, associated with generating BGP session flaps due to hold timer expiration, failing to correct the BGP session flaps, losing a BGP session due to a BGP session flap, losing traffic due to a BGP session flap, and/or the like.

Some implementations described herein relate to a network device that increases robustness of connections by offloading keep alive PDUs. For example, a network device may establish, via an RPD of the network device, BGP sockets with peer network devices and may establish a socket between the RPD and a periodic packet management daemon (PPMD) of the network device. The network device may provide file descriptors of the BGP sockets from the RPD to the PPMD, via the socket, and may provide, from the RPD and via the BGP sockets, non-keep alive PDUs to the peer network devices. The network device may provide, from the PPMD and via the BGP sockets, keep alive PDUs to the peer network devices.

In this way, the network device increases robustness of connections by offloading keep alive PDUs. For example, the network device may cause an RPD to share ownership of BGP sockets (e.g., transmission control protocol (TCP) sockets of BGP connections), created and accepted by the RPD, with a different process (e.g., a PPMD). The PPMD may be responsible for handling keep alive PDUs for the BGP sockets rather than the RPD. The network device may also avoid partial PDU writes from the RPD and/or the PPMD that can lead to an interlacing of messages. Thus, the network device conserves computing resources, networking resources, and/or the like that would otherwise have been consumed by generating BGP session flaps due to hold timer expiration, failing to correct the BGP session flaps, losing a BGP session due to a BGP session flap, losing traffic due to a BGP session flap, and/or the like.

FIGS. 1A-1F are diagrams of an example 100 associated with increasing robustness of connections by offloading keep alive PDUs. As shown in FIGS. 1A-1F, example 100 includes a network with a plurality of network devices. Further details of the network and the network devices are provided elsewhere herein. Although example implementations described herein relate to BGP, the implementations may also be applied to any TCP-based protocols that need periodic keep alive PDUs.

As shown in FIG. 1A, and by reference number 105, the network device may establish, via an RPD, BGP sockets with peer network devices. For example, to establish BGP sockets with the peer network devices, the network device (e.g., the RPD of the network device) may establish BGP sessions with the peer network devices. BGP uses a finite state machine to keep track of a session establishment with each intended peer network device throughout two phases of the session establishment. A finite state machine is a construct by which an object (e.g., a machine) operates in a fixed number of states. Each state carries out a specific purpose and set of operations. The finite state machine may exist in only one of these states at any given moment. A change in state may be triggered by input events. The BGP finite state machine includes six states. An idle state, a connect state, and an active state of the BGP finite state machine pertain to a TCP connection establishment phase. In these states, TCP messages are exchanged to build a TCP connection required for reliable delivery of BGP messages. After the TCP connection establishment phase, BGP enters an opensent state, an openconfirm state, and an established state of the BGP finite state machine, which pertain to a BGP session establishment phase. In these states, BGP exchanges messages relating to the BGP session. The opensent and openconfirm states correspond to an exchange of BGP session attributes between BGP speakers. The established state indicates that a peer network device is in a stable state and can accept BGP routing updates. BGP may maintain a separate finite state machine for each intended peer network device. A peer network device may transition between these states based upon the receipt of input events. For example, if a TCP connection is successfully established in the connect state or the active state, the BGP speaker may send an open message and may enter the opensent state. However, an error event in any state may cause a peer network device to transition to the idle state.

In some implementations, the network device may utilize the RPD to establish BGP sockets (e.g., TCP sockets of BGP connections) or sessions with one or more of the peer network devices. For each of the BGP sessions to be in an established state, each network device of a BGP connection (e.g., the network device and a peer network device) should receive at least one keep alive PDU or one non-keep alive PDU before a hold timer expires. In the network device, BGP input/output threads executing in the RPD may handle BGP input/output traffic (e.g., non-keep alive PDUs).

Figure 1B:
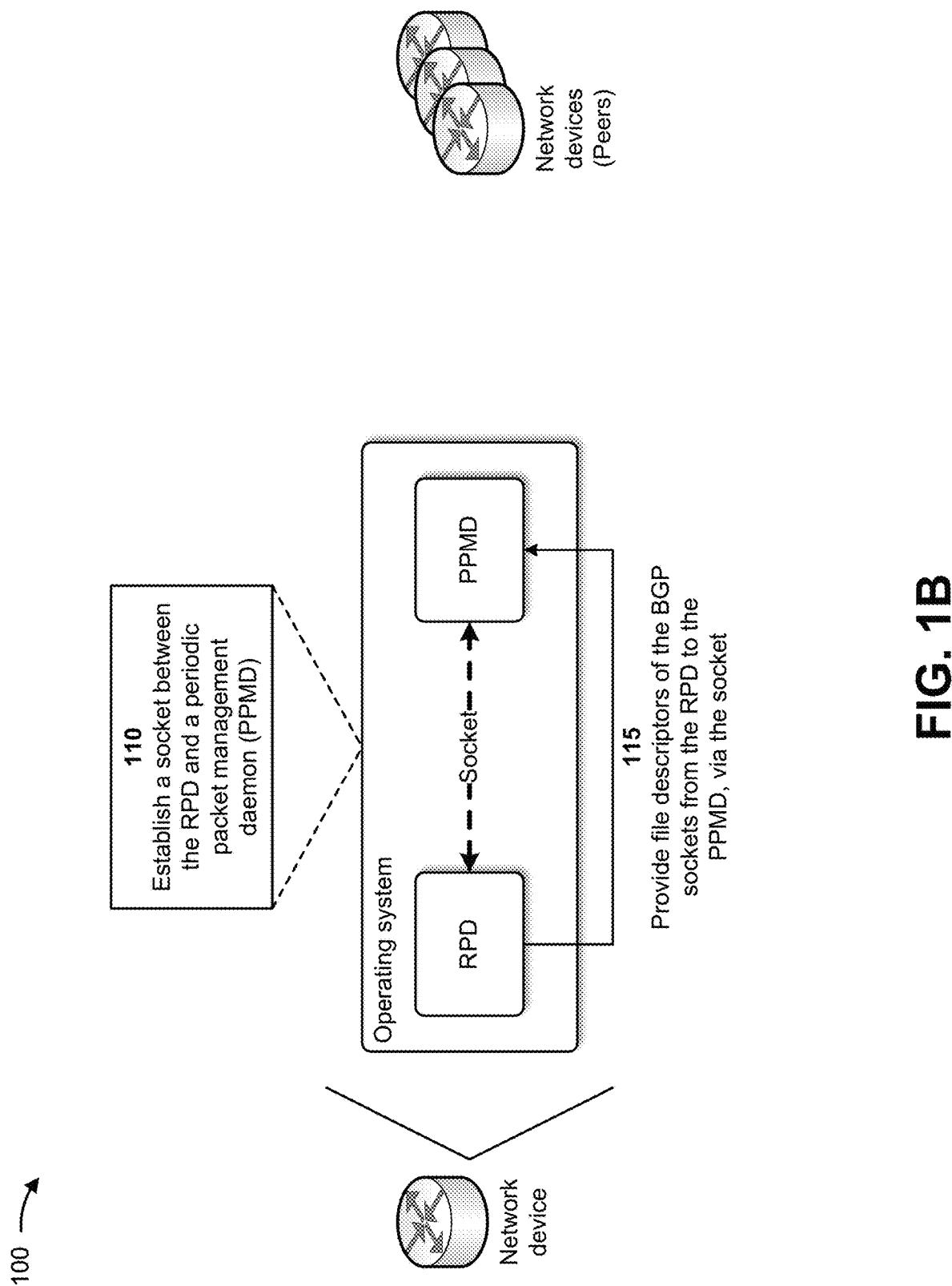

As shown in FIG. 1B, the network device may include an operating system with the RPD and a PPMD. As further shown in FIG. 1B, and by reference number 110, the network device may establish a socket between the RPD and the PPMD. For example, the network device may cause a communication channel (e.g., a socket) to be established between the RPD and the PPMD so that the RPD and PPMD may communicate. In some implementations, the socket established between the RPD and the PPMD may be a Unix domain socket connection.

As further shown in FIG. 1B, and by reference number 115, the network device may provide file descriptors of the BGP sockets from the RPD to the PPMD, via the socket. For example, the RPD may delegate, to the PPMD, the task of generating periodic keep alive PDUs for the BGP sockets established with the peer network devices. In some implementations, the RPD may delegate, to the PPMD, the task of generating periodic keep alive PDUs for the BGP sockets by providing file descriptors of the BGP sockets to the PPMD, via the socket established between the RPD and the PPMD. In some implementations, when providing the file descriptors of the BGP sockets from the RPD to the PPMD, the network device may provide the file descriptors of the BGP sockets from the RPD to the PPMD, via a socket-level control message (SCM) rights socket option (e.g., which may be extended to free and open source Unix-like operating systems, such as FreeBSD). The file descriptors of the BGP sockets may include information identifying the BGP sockets, the peer network devices associated with corresponding BGP sockets, states of the BGP sockets, hold timers associated with the BGP sockets, and/or the like.

Figure 1C:
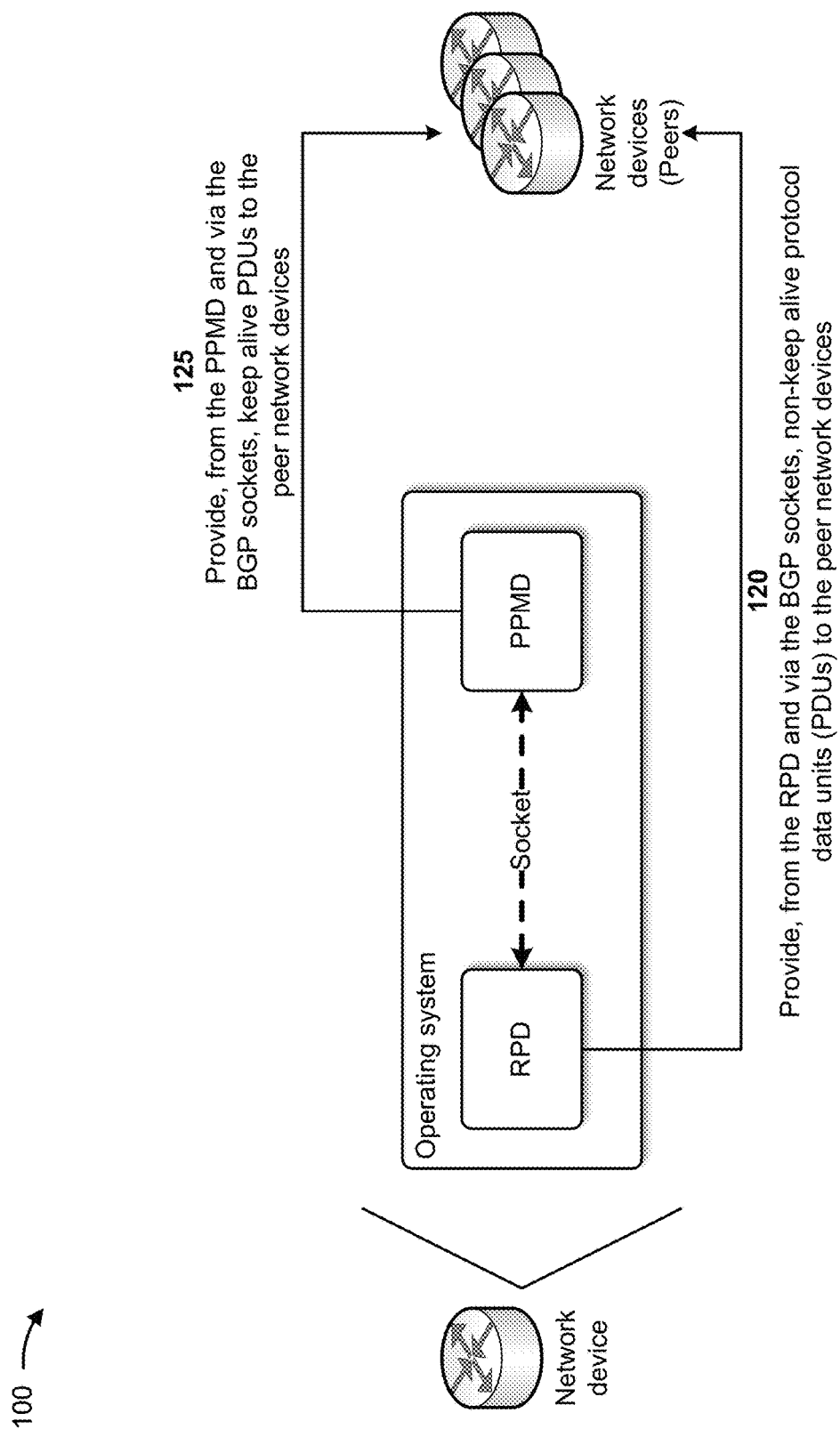

As shown in FIG. 1C, and by reference number 120, the network device may provide, from the RPD and via the BGP sockets, non-keep alive PDUs to the peer network devices. For example, by delegating, to the PPMD, the task of generating periodic keep alive PDUs for the BGP sockets, the RPD may handle tasks associated with non-keep alive PDUs. The non-keep alive PDUs may be associated with other protocol-related activities, such as reacting to route churns in the network, handling local faults in the network device, and/or the like. In some implementations, the RPD of the network device may generate the non-keep alive PDUs and may provide the non-keep alive PDUs to the peer network devices, via the BGP sockets established with the peer network devices.

As further shown in FIG. 1C, and by reference number 125, the network device may provide, from the PPMD and via the BGP sockets, keep alive PDUs to the peer network devices. For example, after receiving the file descriptors of the BGP sockets from the RPD, the PPMD may handle the task of generating periodic keep alive PDUs for the BGP sockets. In some implementations, the PPMD may generate the keep alive PDUs and may provide the keep alive PDUs to the peer network devices, via the BGP sockets established with the peer network devices. Based on the file descriptors of the BGP sockets, the PPMD may be aware of the hold timers associated with the BGP sockets and may provide the keep alive PDUs to the peer network devices, via the BGP sockets, prior to expiration of the hold timers associated with the BGP sockets. In this way, the PPMD may prevent BGP session flaps due to hold timer expiration.

Figure 1D:
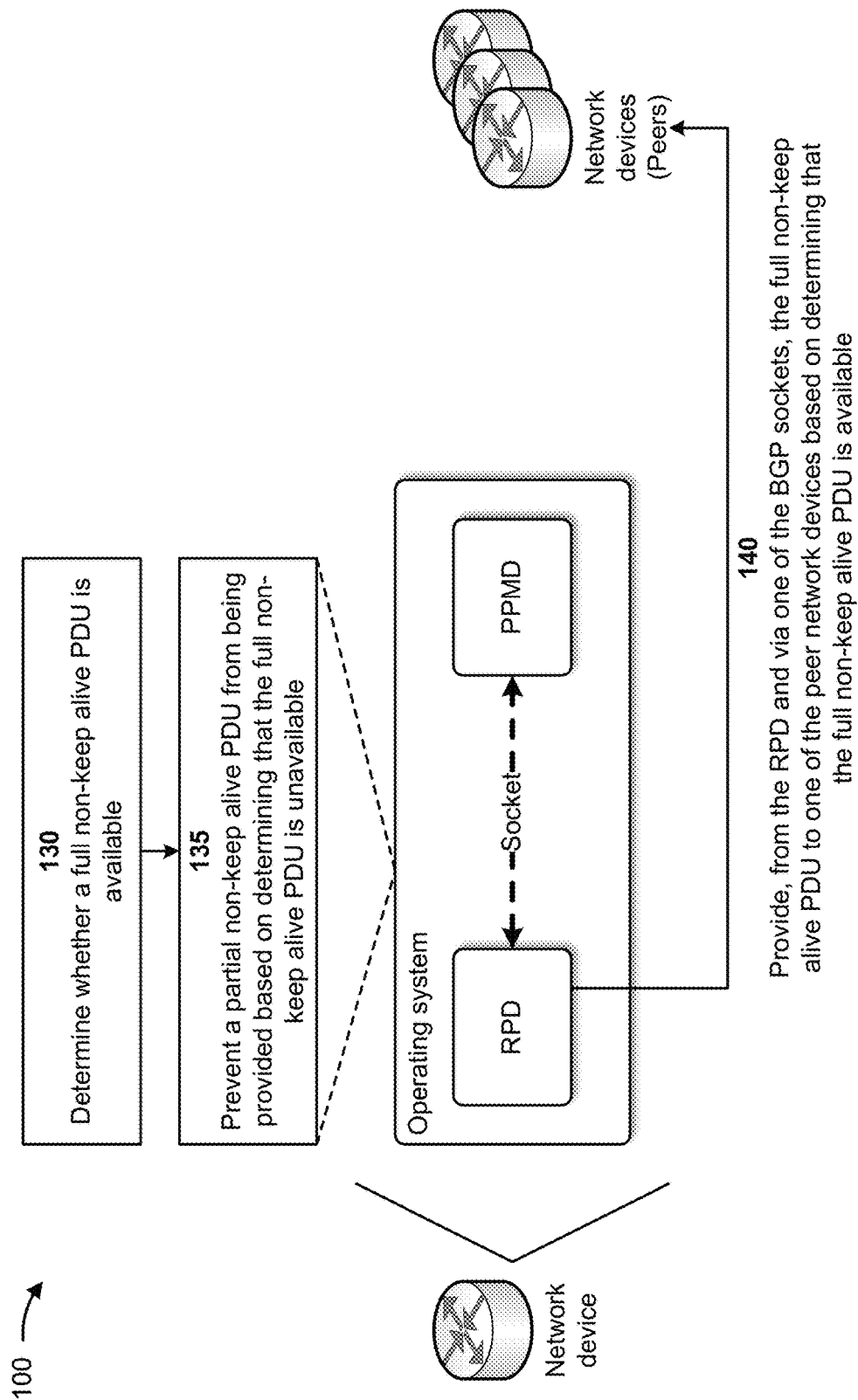

As shown in FIG. 1D, and by reference number 130, the network device (e.g., the kernel of the network device) may determine whether a full non-keep alive PDU is available. For example, when an application executes a write, a send message, and/or the like there is no guarantee that a full message (e.g., a PDU) is written and/or sent to a kernel of the network device. This may result in a possibility of partial writes (e.g., partial PDUs). If such partial writes occur, and if the RPD writes partial PDUs on a BGP socket, then PDU message boundaries will be lost (e.g., if the PPMD attempts to send a keep-alive PDU at this moment) and cause PDU parsing errors on a peer network device. To prevent this, the network device may determine whether a full non-keep alive PDU is available prior to providing a non-keep alive PDU to one of the peer network devices, via one of the BGP sockets corresponding to the one of the peer network devices. In some implementations, the network device may determine that a full non-keep alive PDU is unavailable. Alternatively, the network device may determine that a full non-keep alive PDU is available.

In some implementations, to prevent writing of partial PDUs, the network device may add a socket option to the kernel of the network device. When the socket option is enabled for a BGP socket, the kernel may only accept all bytes written by an application (e.g., a full non-keep alive PDU) for the BGP socket. Alternatively, the network device may utilize a shared lock per BGP socket to coordinate shared write access to the BGP socket between the RPD and the PPMD. Before writing a PDU, the RPD or the PPMD may select the shared lock and may release the shared lock once a full PDU is written. In this way, if a partial write occurs for one process, then other processes do not receive the shared lock to start writes.

As further shown in FIG. 1D, and by reference number 135, the network device (e.g., the kernel of the network device via the socket option) may prevent a partial non-keep alive PDU from being provided based on determining that the full non-keep alive PDU is unavailable. For example, if the network device determines that a full non-keep alive PDU is unavailable (e.g., only a partial non-keep alive PDU is available), the network device may prevent the partial non-keep alive PDU from being provided to one of the peer network devices, via a corresponding one of the BGP sockets. In some implementations, when preventing the partial non-keep alive PDU from being provided, the network device may prevent the partial non-keep alive PDU from being provided based on enablement of the socket option that only accepts full non-keep alive PDUs. In some implementations, when preventing the partial non-keep alive PDU from being provided, the network device may prevent the partial non-keep alive PDU from being provided based on sharing the lock between the RPD and the PPMD for each of the BGP sockets.

As further shown in FIG. 1D, and by reference number 140, the network device may provide, from the RPD and via one of the BGP sockets, the full non-keep alive PDU to one of the peer network devices based on determining that the full non-keep alive PDU is available. For example, if the network device determines that a full non-keep alive PDU is available, the RPD may provide the full non-keep alive PDU to one of the peer network devices via a corresponding one of the BGP sockets. In some implementations, the RPD of the network device may utilize the socket option or the shared lock to determine that the full non-keep alive PDU can be provided to the one of the peer network devices via the corresponding one of the BGP sockets.

Figure 1E:
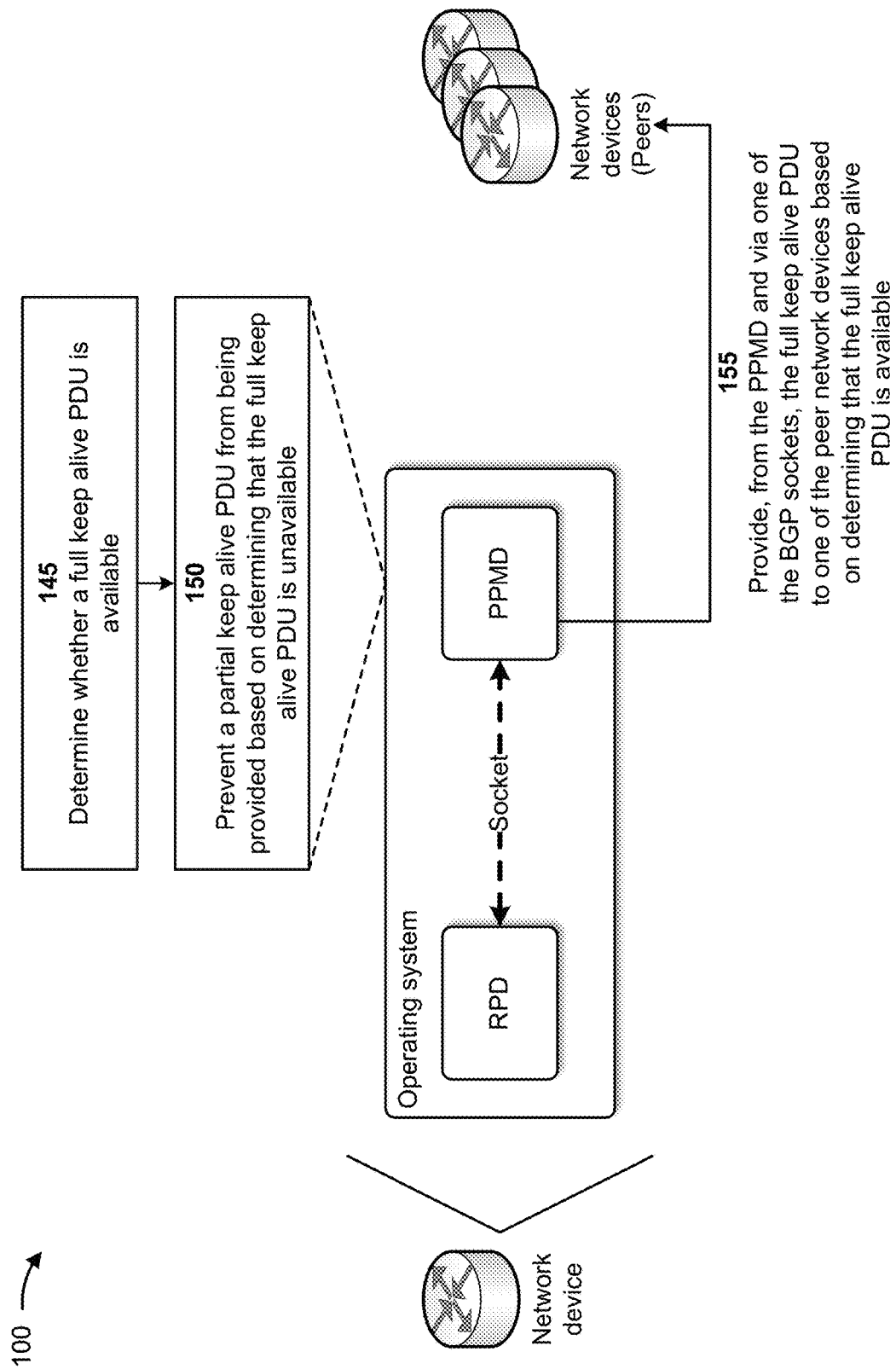

As shown in FIG. 1E, and by reference number 145, the network device (e.g., the kernel of the network device via the socket option) may determine whether a full keep alive PDU is available. For example, when an application executes a write, a send message, and/or the like there is no guarantee that a full message (e.g., a PDU) is written and/or sent to a kernel of the network device. This may result in a possibility of partial writes (e.g., partial PDUs). If such partial writes occur, and if the PPMD writes partial PDUs on a BGP socket, then PDU message boundaries will be lost and cause PDU parsing errors on a peer network device. To prevent this, the network device may determine whether a full keep alive PDU is available prior to providing a keep alive PDU to one of the peer network devices, via one of the BGP sockets corresponding to the one of the peer network devices. In some implementations, the network device may determine that a full keep alive PDU is unavailable. Alternatively, the network device may determine that a full keep alive PDU is available.

As further shown in FIG. 1E, and by reference number 150, the network device may prevent a partial keep alive PDU from being provided based on determining that the full keep alive PDU is unavailable. For example, if the network device determines that a full keep alive PDU is unavailable (e.g., only a partial keep alive PDU is available), the network device may prevent the partial keep alive PDU from being provided to one of the peer network devices, via a corresponding one of the BGP sockets. In some implementations, when preventing the partial keep alive PDU from being provided, the network device may prevent the partial keep alive PDU from being provided based on enablement of the socket option that only accepts full keep alive PDUs. In some implementations, when preventing the partial keep alive PDU from being provided, the network device may prevent the partial keep alive PDU from being provided based on sharing the lock between the RPD and the PPMD for each of the BGP sockets.

As further shown in FIG. 1E, and by reference number 155, the network device may provide, from the PPMD and via one of the BGP sockets, the full keep alive PDU to one of the peer network devices based on determining that the full keep alive PDU is available. For example, if the network device determines that a full keep alive PDU is available, the PPMD may provide the full keep alive PDU to one of the peer network devices via a corresponding one of the BGP sockets. In some implementations, the network device may utilize the socket option or the shared lock to determine that the full keep alive PDU can be provided to the one of the peer network devices via the corresponding one of the BGP sockets.

Figure 1F:
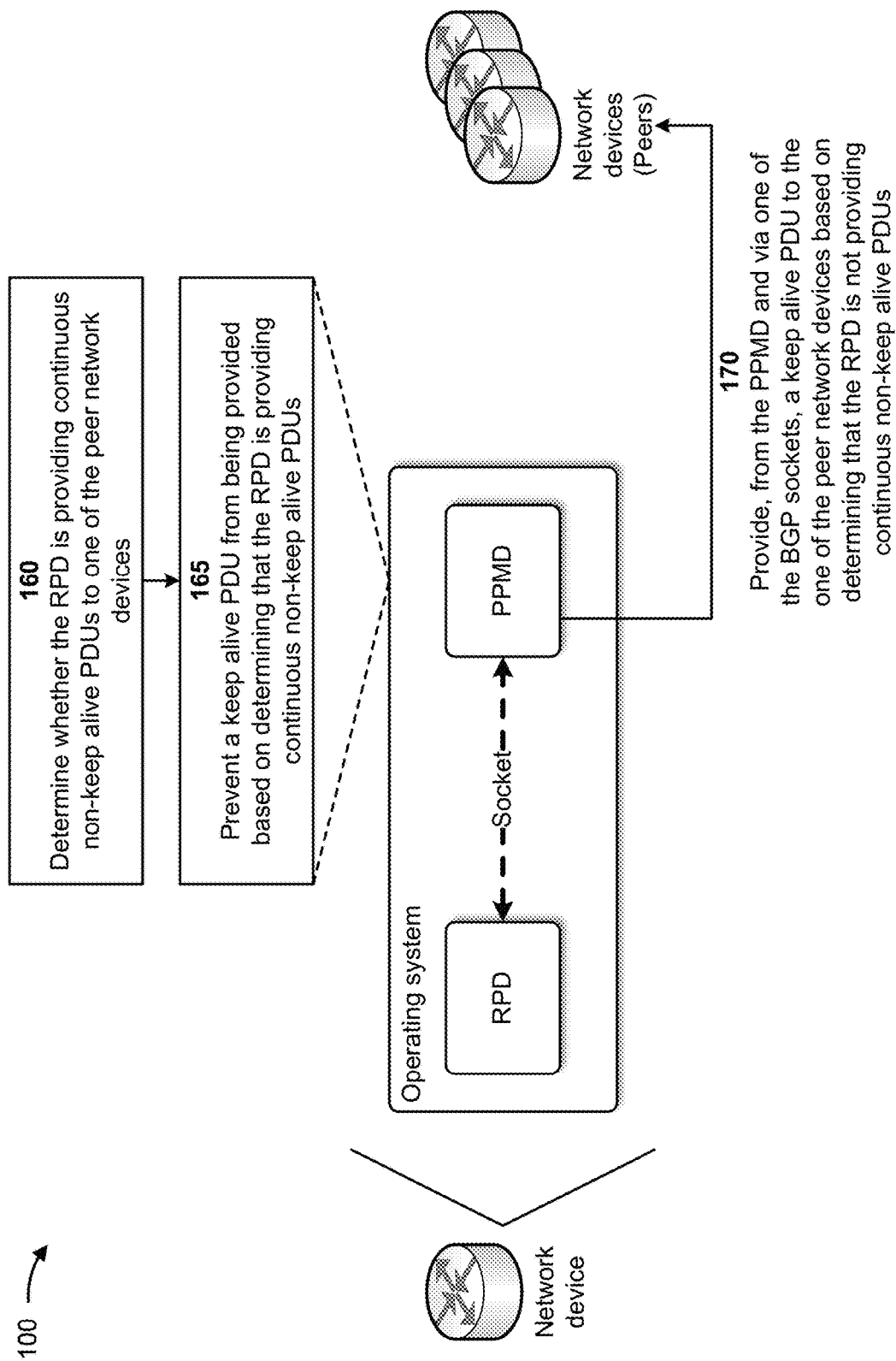

As shown in FIG. 1F, and by reference number 160, the network device (e.g., the kernel of the network device via the socket option) may determine whether the RPD is providing continuous non-keep alive PDUs to one of the peer network devices. For example, in BGP, regular keep alive PDUs need not be exchanged if there is continuous exchange of non-keep alive PDUs since the continuous non-keep alive PDUs act as an acknowledgment that a network device is active. Thus, the network device may determine whether the RPD is providing continuous non-keep alive PDUs to one of the peer network devices. In some implementations, the network device may determine that the RPD is providing continuous non-keep alive PDUs to the one of the peer network devices. Alternatively, the network device may determine that the RPD is not providing continuous non-keep alive PDUs to the one of the peer network devices.

In some implementations, when determining whether the RPD is providing continuous non-keep alive PDUs to the one of the peer network devices, the network device may determine whether the RPD is providing continuous non-keep alive PDUs to the one of the peer network devices based on whether a socket send buffer, associated with the RPD, is empty. In such implementations, the network device may analyze a state of the socket send buffer to determine whether the socket send buffer is empty. Alternatively, the network device may provide an interface (e.g., an ioctl interface that is a single system call that communicates with device drivers) and may enqueue PDU bytes provided by PPMD only if the socket send buffer is empty. This may enable the network device to atomically check and write in a single critical section.

As further shown in FIG. 1F, and by reference number 165, the network device may prevent a keep alive PDU from being provided based on determining that the RPD is providing continuous non-keep alive PDUs. For example, if the network device determines that the RPD is providing continuous non-keep alive PDUs, the network device may prevent a keep alive PDU from being provided to the one of the peer network devices. In this way, the network device may conserve resources associated with providing unnecessary keep alive PDUs to a peer network device that is receiving continuous non-keep alive PDUs from the RPD.

As further shown in FIG. 1F, and by reference number 170, the network device may provide, from the PPMD and via one of the BGP sockets, a keep alive PDU to the one of the peer network devices based on determining that the RPD is not providing continuous non-keep alive PDUs. For example, if the network device determines that the RPD is not providing continuous non-keep alive PDUs, the PPMD may provide a keep alive PDU to the one of the peer network devices, via a corresponding one of the BGP sockets. In this way, the network device may prevent a BGP session flap from occurring with the one of the peer network devices.

In some implementations, the network device may delegate generation of the BGP keep alive PDUs to the kernel of the network device. The kernel may be informed about a format of the keep alive PDUs and hold timers to utilized when providing the keep alive PDUs at periodic intervals.

In this way, the network device increases robustness of connections by offloading keep alive PDUs. For example, the network device may cause an RPD to share ownership of BGP sockets (e.g., TCP sockets of BGP connections), created and accepted by the RPD, with a different process (e.g., a PPMD). The PPMD may be responsible for handling keep alive PDUs for the BGP sockets rather than the RPD. The network device may also avoid partial PDU writes from the RPD and/or the PPMD that can lead to an interlacing of messages. Thus, the network device conserves computing resources, networking resources, and/or the like that would otherwise have been consumed by generating BGP session flaps due to hold timer expiration, failing to correct the BGP session flaps, losing an BGP session due to an BGP session flap, losing traffic due to a BGP session flap, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
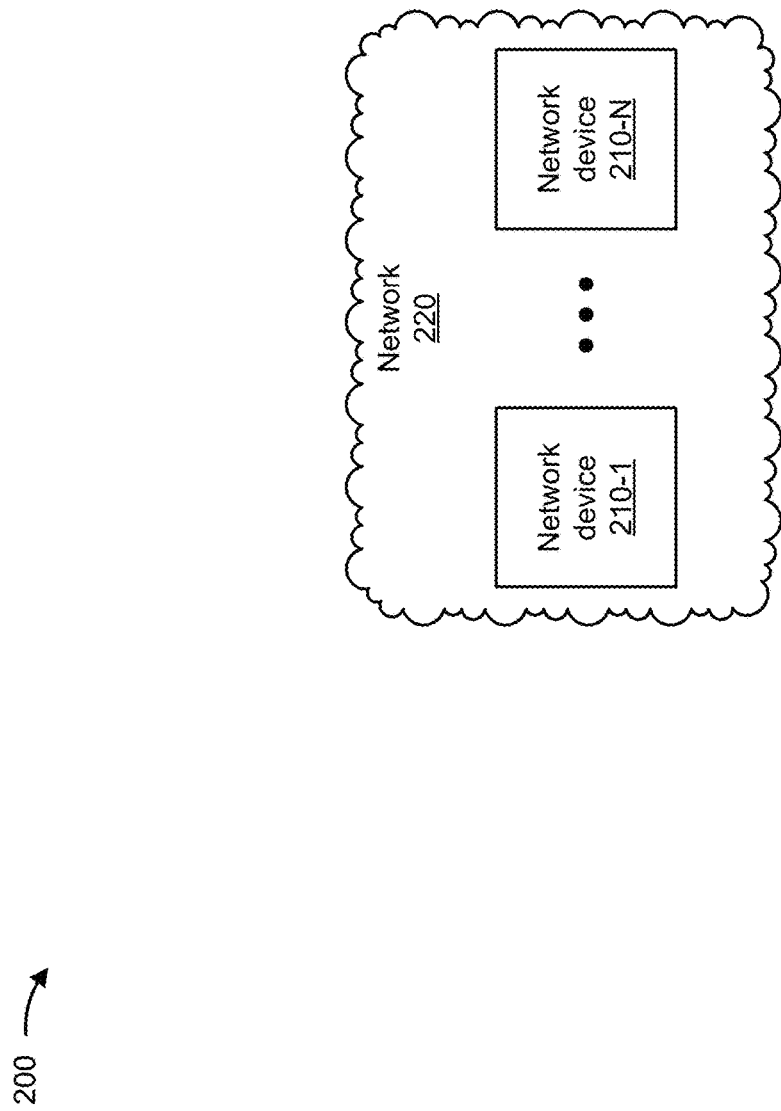
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 210 (shown as network device 210-1 through network device 210-N) and a network 220. Devices of the environment 200 may interconnect via wired connections, wireless connections, or a combination of wired and wireless connections.

The network device 210 includes one or more devices capable of receiving, processing, storing, routing, and/or providing traffic (e.g., a packet or other information or metadata) in a manner described herein. For example, the network device 210 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 210 may include a gateway, a switch, a firewall, a hub, a bridge, a reverse proxy, a server (e.g., a proxy server, a cloud server, or a data center server), a load balancer, and/or a similar device. In some implementations, the network device 210 may be a physical device implemented within a housing, such as a chassis. In some implementations, the network device 210 may be a virtual device implemented by one or more computer devices of a cloud computing environment or a data center. In some implementations, a group of network devices 210 may be a group of data center nodes that are used to route traffic flow through the network 220.

The network 220 includes one or more wired and/or wireless networks. For example, the network 220 may include a packet switched network, a cellular network (e.g., a fifth generation (5G) network, a fourth generation (4G) network, such as a long-term evolution (LTE) network, a third generation (3G) network, or a code division multiple access (CDMA) network, among other examples), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
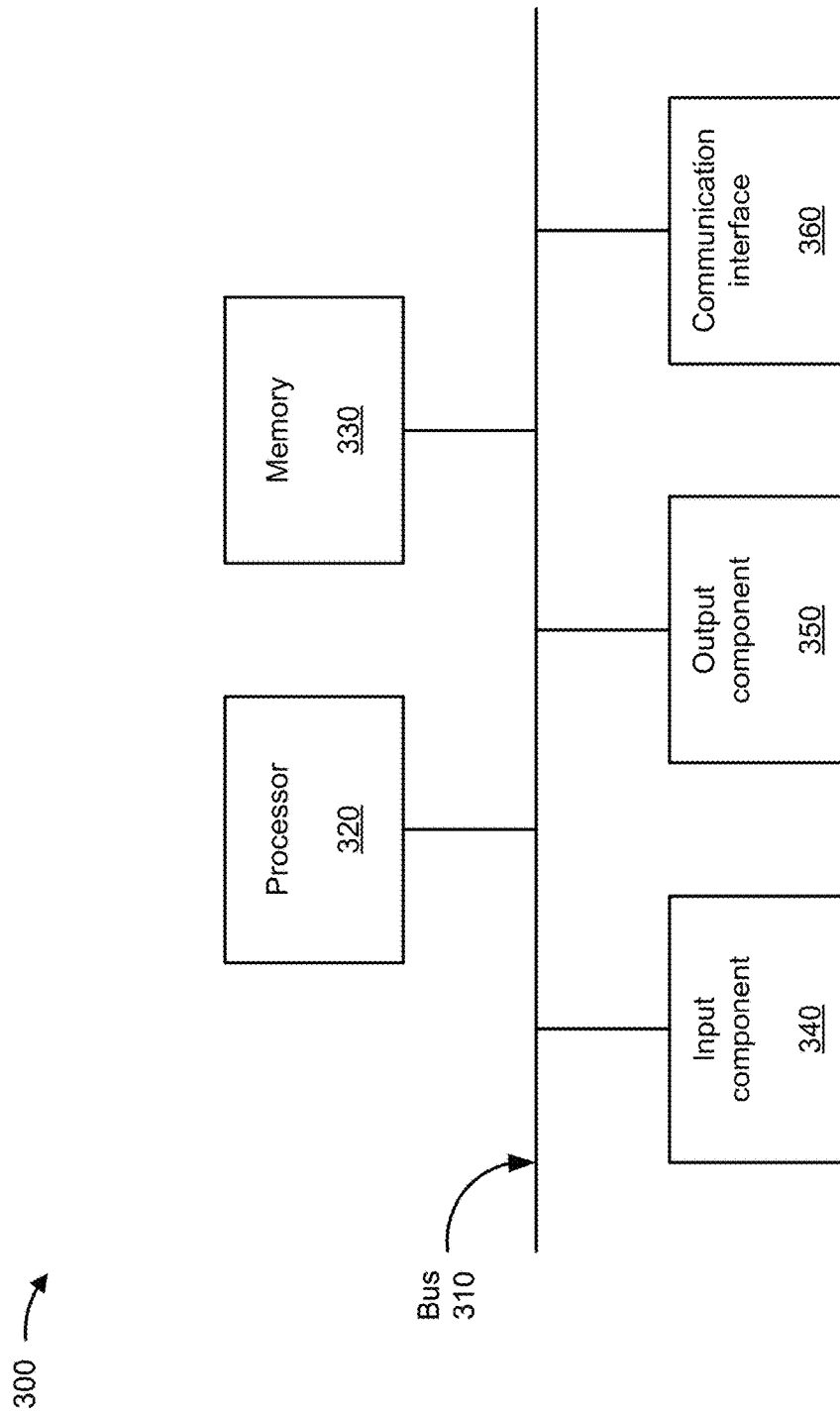
FIGS. 3 and 4 are diagrams of example components of one or more devices of FIG. 2.

FIG. 3 is a diagram of example components of one or more devices of FIG. 2. The example components may be included in a device 300, which may correspond to the network device 210. In some implementations, the network device 210 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein. The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
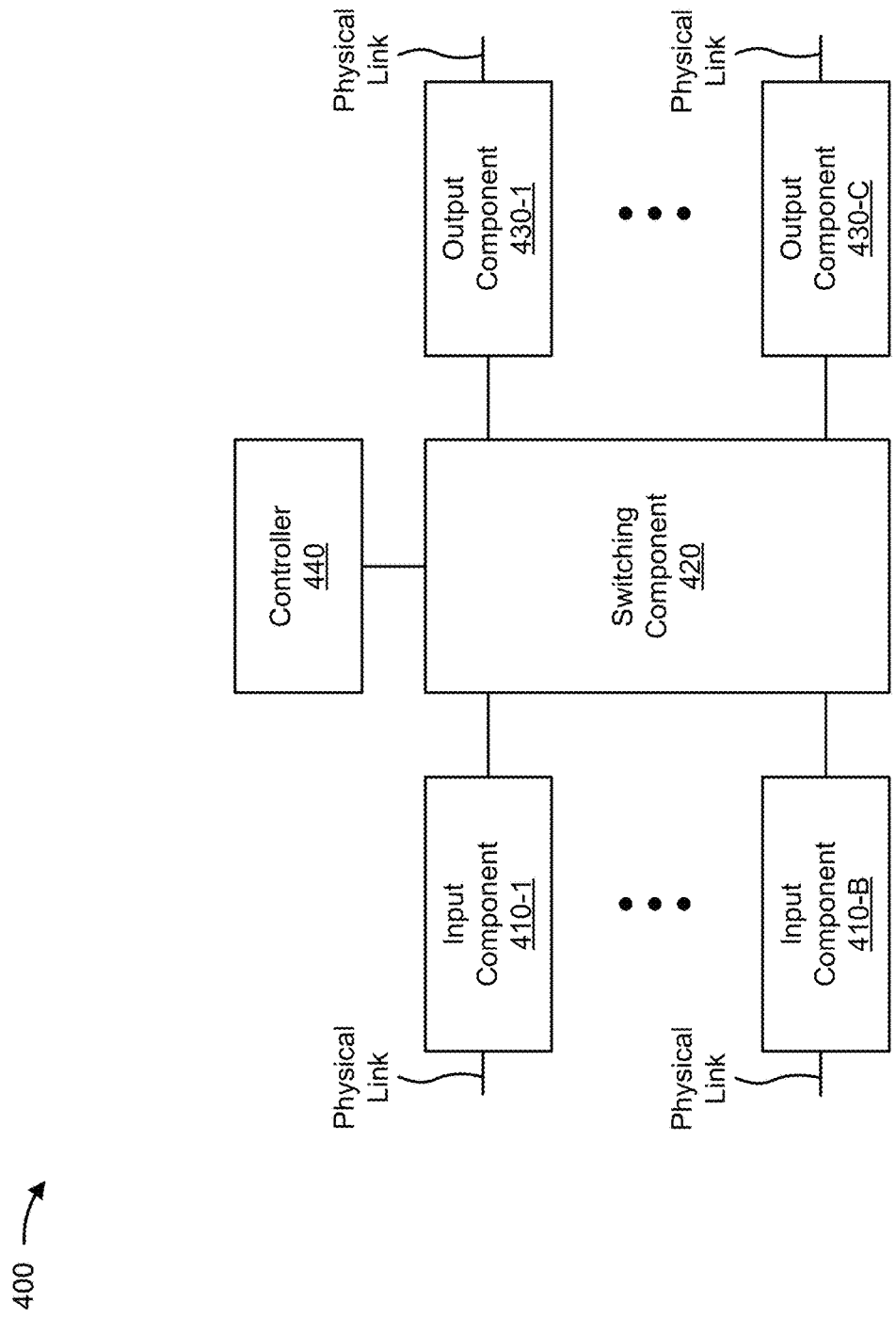

FIG. 4 is a diagram of example components of one or more devices of FIG. 2. The example components may be included in a device 400. The device 400 may correspond to the network device 210. In some implementations, the network device 210 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
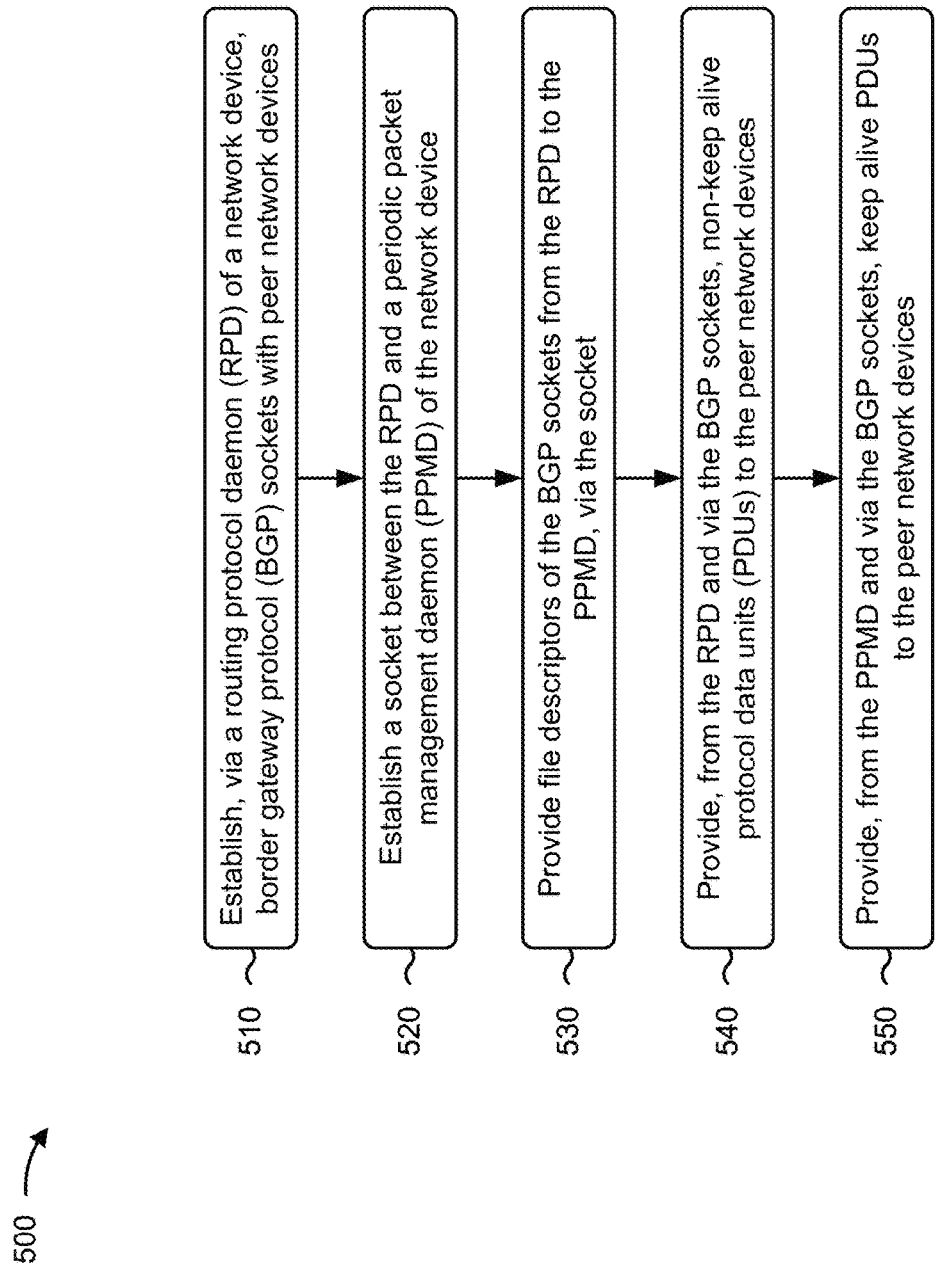
FIG. 5 is a flowchart of an example process for increasing robustness of connections by offloading keep alive PDUs.

FIG. 5 is a flowchart of an example process 500 for increasing robustness of connections by offloading keep alive PDUs. In some implementations, one or more process blocks of FIG. 5 may be performed by a network device (e.g., the network device 210). In some implementations, one or more process blocks of FIG. 5 may be performed by another device or a group of devices separate from or including the network device. Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include establishing, via an RPD of a network device, BGP sockets with peer network devices (block 510). For example, the network device may establish, via an RPD of the network device, BGP sockets with peer network devices, as described above.

As further shown in FIG. 5, process 500 may include establishing a socket between the RPD and a PPMD of the network device (block 520). For example, the network device may establish a socket between the RPD and a PPMD of the network device, as described above. In some implementations, the socket established between the RPD and the PPMD is a Unix domain socket connection.

As further shown in FIG. 5, process 500 may include providing file descriptors of the BGP sockets from the RPD to the PPMD, via the socket (block 530). For example, the network device may provide file descriptors of the BGP sockets from the RPD to the PPMD, via the socket, as described above. In some implementations, providing the file descriptors of the BGP sockets from the RPD to the PPMD includes providing the file descriptors of the BGP sockets from the RPD to the PPMD, via a socket-level control message rights socket option.

As further shown in FIG. 5, process 500 may include providing, from the RPD and via the BGP sockets, non-keep alive PDUs to the peer network devices (block 540). For example, the network device may provide, from the RPD and via the BGP sockets, non-keep alive PDUs to the peer network devices, as described above.

As further shown in FIG. 5, process 500 may include providing, from the PPMD and via the BGP sockets, keep alive PDUs to the peer network devices (block 550). For example, the network device may provide, from the PPMD and via the BGP sockets, keep alive PDUs to the peer network devices, as described above.

In some implementations, process 500 includes determining whether a full non-keep alive PDU is available, and preventing a partial non-keep alive PDU from being provided based on determining that the full non-keep alive PDU is not available. In some implementations, preventing the partial non-keep alive PDU from being provided includes preventing the partial non-keep alive PDU from being provided based on enablement of an option that only accepts full non-keep alive PDUs. In some implementations, preventing the partial non-keep alive PDU from being provided includes preventing the partial non-keep alive PDU from being provided based on sharing a lock between the RPD and the PPMD for each of the BGP sockets.

In some implementations, process 500 includes determining whether a full non-keep alive PDU is available, and providing, from the RPD and via one of the BGP sockets, the full non-keep alive PDU to one of the peer network devices based on determining that the full non-keep alive PDU is available.

In some implementations, process 500 includes determining whether a full keep alive PDU is available, and preventing a partial keep alive PDU from being provided based on determining that the full keep alive PDU is not available. In some implementations, process 500 includes determining whether a full keep alive PDU is available, and providing, from the PPMD and via one of the BGP sockets, the full keep alive PDU to one of the peer network devices based on determining that the full keep alive PDU is available.

In some implementations, process 500 includes determining whether the RPD is providing continuous non-keep alive PDUs to one of the peer network devices, and preventing a keep alive PDU from being provided to the one of the peer network devices based on determining that the RPD is providing continuous non-keep alive PDUs to the one of the peer network devices. In some implementations, determining whether the RPD is providing continuous non-keep alive PDUs to the one of the peer network devices includes determining whether the RPD is providing continuous non-keep alive PDUs to the one of the peer network devices based on whether a socket send buffer, associated with the RPD, is empty.

In some implementations, process 500 includes determining whether the RPD is providing continuous non-keep alive PDUs to one of the peer network devices, and providing, from the PPMD and via one of the protocol sockets, a keep alive PDU to the one of the peer network devices based on determining that the RPD is not providing continuous non-keep alive PDUs to the one of the peer network devices. In some implementations, determining whether the RPD is providing continuous non-keep alive PDUs to the one of the peer network devices, includes one of determining that the RPD is providing continuous non-keep alive PDUs to the one of the peer network devices based on a socket send buffer, associated with the RPD, not being empty; or determining that the RPD is not providing continuous non-keep alive PDUs to the one of the peer network devices based on the socket send buffer, associated with the RPD, being empty.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   establishing, via a routing protocol daemon (RPD) of a network device, border gateway protocol (BGP) sockets with peer network devices;
   establishing, by the network device, a socket between the RPD and a periodic packet management daemon (PPMD) of the network device;
   providing, by the network device, file descriptors of the BGP sockets from the RPD to the PPMD, via the socket established between the RPD and the PPMD;
   providing, from the RPD and via the BGP sockets, non-keep alive protocol data units (PDUs) to the peer network devices; and
   providing, from the PPMD and via the BGP sockets, keep alive PDUs to the peer network devices.

2. The method of claim 1, further comprising:
   determining whether a full non-keep alive PDU is available; and
   preventing a partial non-keep alive PDU from being provided based on determining that the full non-keep alive PDU is not available.

3. The method of claim 2, wherein preventing the partial non-keep alive PDU from being provided comprises:
   preventing the partial non-keep alive PDU from being provided based on enablement of an option that only accepts full non-keep alive PDUs.

4. The method of claim 2, wherein preventing the partial non-keep alive PDU from being provided comprises:
   preventing the partial non-keep alive PDU from being provided based on sharing a lock between the RPD and the PPMD for each of the BGP sockets.

5. The method of claim 1, further comprising:
   determining whether a full non-keep alive PDU is available; and
   providing, from the RPD and via one of the BGP sockets, the full non-keep alive PDU to one of the peer network devices based on determining that the full non-keep alive PDU is available.

6. The method of claim 1, further comprising:
   determining whether a full keep alive PDU is available; and
   preventing a partial keep alive PDU from being provided based on determining that the full keep alive PDU is not available.

7. The method of claim 1, further comprising:
   determining whether a full keep alive PDU is available; and
   providing, from the PPMD and via one of the BGP sockets, the full keep alive PDU to one of the peer network devices based on determining that the full keep alive PDU is available.

8. A network device, comprising:
   one or more memories; and
   one or more processors to:
     establish, via a routing protocol daemon (RPD) of a network device, protocol sockets with peer network devices;
     establish a socket between the RPD and a periodic packet management daemon (PPMD) of the network device;

provide file descriptors of the protocol sockets from the RPD to the PPMD, via the socket established between the RPD and the PPMD;

provide, from the RPD and via the protocol sockets, non-keep alive protocol data units (PDUs) to the peer network devices; and provide, from the PPMD and via the protocol sockets, keep alive PDUs to the peer network devices.

9. The network device of claim 8, wherein the one or more processors are further to:

determine whether the RPD is providing continuous non-keep alive PDUs to one of the peer network devices; and prevent a keep alive PDU from being provided to the one of the peer network devices based on determining that the RPD is providing continuous non-keep alive PDUs to the one of the peer network devices.

10. The network device of claim 9, wherein the one or more processors, to determine whether the RPD is providing continuous non-keep alive PDUs to the one of the peer network devices, are to:

determine whether the RPD is providing continuous non-keep alive PDUs to the one of the peer network devices based on whether a socket send buffer, associated with the RPD, is empty.

11. The network device of claim 8, wherein the one or more processors are further to:

determine whether the RPD is providing continuous non-keep alive PDUs to one of the peer network devices; and provide, from the PPMD and via one of the protocol sockets, a keep alive PDU to the one of the peer network devices based on determining that the RPD is not providing continuous non-keep alive PDUs to the one of the peer network devices.

12. The network device of claim 11, wherein the one or more processors, to determine whether the RPD is providing continuous non-keep alive PDUs to the one of the peer network devices, are to one of:

determine that the RPD is providing continuous non-keep alive PDUs to the one of the peer network devices based on a socket send buffer, associated with the RPD, not being empty; or determine that the RPD is not providing continuous non-keep alive PDUs to the one of the peer network devices based on the socket send buffer, associated with the RPD, being empty.

13. The network device of claim 8, wherein the socket established between the RPD and the PPMD is a Unix domain socket connection.

14. The network device of claim 8, wherein the one or more processors, to provide the file descriptors of the protocol sockets from the RPD to the PPMD, are to:

provide the file descriptors of the protocol sockets from the RPD to the PPMD, via a socket-level control message rights socket option.

15. A non-transitory computer-readable medium storing a set of instructions, the set of instructions comprising:

one or more instructions that, when executed by one or more processors of a network device, cause the network device to:

establish, via a routing protocol daemon (RPD) of a network device, border gateway protocol (BGP) sockets with peer network devices;

establish a socket between the RPD and a periodic packet management daemon (PPMD) of the network device;

provide file descriptors of the BGP sockets from the RPD to the PPMD, via the socket established between the RPD and the PPMD and a socket-level control message rights socket option;

provide, from the RPD and via the BGP sockets, non-keep alive protocol data units (PDUs) to the peer network devices; and provide, from the PPMD and via the BGP sockets, keep alive PDUs to the peer network devices.

16. The non-transitory computer-readable medium of claim 15, wherein the one or more instructions further cause the network device to:

determine whether a full non-keep alive PDU is available; and prevent a partial non-keep alive PDU from being provided based on determining that the full non-keep alive PDU is not available.

17. The non-transitory computer-readable medium of claim 15, wherein the one or more instructions further cause the network device to:

determine whether a full non-keep alive PDU is available; and provide, from the RPD and via one of the BGP sockets, the full non-keep alive PDU to one of the peer network devices based on determining that the full non-keep alive PDU is available.

18. The non-transitory computer-readable medium of claim 15, wherein the one or more instructions further cause the network device to:

determine whether a full keep alive PDU is available; and prevent a partial keep alive PDU from being provided based on determining that the full keep alive PDU is not available.

19. The non-transitory computer-readable medium of claim 15, wherein the one or more instructions further cause the network device to:

determine whether a full keep alive PDU is available; and provide, from the PPMD and via one of the BGP sockets, the full keep alive PDU to one of the peer network devices based on determining that the full keep alive PDU is available.

20. The non-transitory computer-readable medium of claim 15, wherein the one or more instructions further cause the network device to:

determine whether the RPD is providing continuous non-keep alive PDUs to one of the peer network devices; and prevent a keep alive PDU from being provided to the one of the peer network devices based on determining that the RPD is providing continuous non-keep alive PDUs to the one of the peer network devices.

\* \* \* \* \*